(12) United States Patent
Yasuhara et al.

(10) Patent No.: US 12,013,716 B2
(45) Date of Patent: Jun. 18, 2024

(54) OPERATING DEVICE

(71) Applicant: Alps Alpine Co., Ltd., Tokyo (JP)

(72) Inventors: Ryuichiro Yasuhara, Miyagi-ken (JP); Atsushi Goto, Miyagi-ken (JP)

(73) Assignee: Alps Alpine Co., Ltd. (JP)

(*) Notice: Subject to any disclaimer, the term of this patent is extended or adjusted under 35 U.S.C. 154(b) by 358 days.

(21) Appl. No.: 17/557,102

(22) Filed: Dec. 21, 2021

(65) Prior Publication Data
US 2022/0113752 A1 Apr. 14, 2022

Related U.S. Application Data

(63) Continuation of application No. PCT/JP2020/010986, filed on Mar. 13, 2020.

(30) Foreign Application Priority Data

Jun. 27, 2019 (JP) .................................. 2019-119962

(51) Int. Cl.
| | |
|---|---|
| *G05G 5/03* | (2008.04) |
| *G05G 1/08* | (2006.01) |
| *G06F 3/01* | (2006.01) |
| *H01H 3/00* | (2006.01) |
| *H02K 7/102* | (2006.01) |
| *H02K 26/00* | (2006.01) |

(52) U.S. Cl.
CPC ................ *G05G 5/03* (2013.01); *G05G 1/08* (2013.01); *G06F 3/016* (2013.01); *H01H 2003/008* (2013.01); *H02K 7/1023* (2013.01); *H02K 26/00* (2013.01)

(58) Field of Classification Search
CPC . G05G 5/03; G05G 1/08; G06F 3/016; H01H 2003/008
See application file for complete search history.

(56) References Cited

U.S. PATENT DOCUMENTS

| | | |
|---|---|---|
| 2018/0080511 A1 | 3/2018 | Takahashi et al. |
| 2018/0284891 A1 | 10/2018 | Eck et al. |

FOREIGN PATENT DOCUMENTS

| | | | |
|---|---|---|---|
| JP | 2010211270 A | 9/2010 | |
| WO | WO-2018193981 A1 * | 10/2018 | ........... F16D 57/002 |

OTHER PUBLICATIONS

International Search Report for corresponding International Application No. PCT/JP2020/010986 dated May 21, 2020 with English translation (5 Pages).

* cited by examiner

*Primary Examiner* — Randell J Krug
(74) *Attorney, Agent, or Firm* — Harness, Dickey & Pierce, P.L.C.

(57) ABSTRACT

In an operating device, a brake setting unit sets a target braking torque based on a braking torque pattern, and a rotational torque setting unit sets a target rotational torque based on a rotational torque pattern in accordance with information detected by a rotation detecting portion at reference time intervals. A control unit includes a time change adjustment unit. For at least one of the braking torque and the rotational torque, the time change adjustment unit changes the braking torque so that a current braking torque reaches the target braking torque and/or changes the rotational torque so that a current rotational torque reaches the target rotational torque in a predetermined time period greater than the reference time interval.

8 Claims, 6 Drawing Sheets

OPERATING DEVICE

CLAIM OF PRIORITY

This application is a Continuation of International Application No. PCT/JP2020/010986 filed on Mar. 13, 2020, which claims benefit of Japanese Patent Application No. 2019-119962 filed on Jun. 27, 2019. The entire contents of each application noted above are hereby incorporated by reference.

BACKGROUND OF THE INVENTION

1. Field of the Invention

The present invention relates to an operating device capable of applying braking torque and rotational torque to a rotating body.

2. Description of the Related Art

The haptic feedback input device described in Japanese Unexamined Patent Application Publication No. 2010-211270 includes braking means that generates rotational resistance to a rotation operation performed on an operation unit to be rotationally operated and motor means that rotates the operation unit to generate a self sustaining rotational force. Since the haptic feedback input device has two drive sources, that is, a braking means and a motor means, the haptic feedback input device can generate a variety of haptic feedbacks including stronger rotational resistance, and can reduce power consumption to a low level.

SUMMARY OF THE INVENTION

In the haptic feedback input devices, a more variety of haptic feedbacks are required. However, in the haptic feedback input device described in Japanese Unexamined Patent Application Publication No. 2010-211270, the transition of the haptic feedback such that the torque pattern is changed according to the difference in the direction and speed of the rotation operation is not taken into consideration. Furthermore, if the torque pattern is changed during the operation performed by the operator, there is a possibility that the operator may feel an unexpected discomfort.

Therefore, the present invention provides an operating device capable of creating a more variety of haptic feedbacks and reducing a sense of discomfort felt by the operator.

To solve the above problem, the operating device according to the present invention includes a fixed portion, a rotating body rotatably supported by the fixed portion, a rotation detecting portion configured to detect information regarding rotation of the rotating body including at least rotation angles at reference time intervals, a brake applying portion configured to apply braking torque to the rotating body, a rotational torque applying portion configured to apply rotational torque to the rotating body, and a control unit configured to control the brake applying portion and the rotational torque applying portion. The control unit includes a brake setting unit that controls the brake applying portion, a rotational torque setting unit that controls the rotational torque applying portion, and the storage unit that stores a braking torque pattern representing an angle change in the braking torque and a rotational torque pattern representing an angle change in the rotational torque. The control unit outputs a control signal to the brake setting unit and the rotational torque setting unit at the reference time intervals. The brake setting unit sets a target torque based on the braking torque pattern, and the rotational torque setting unit sets a target rotational torque based on the rotational torque pattern in accordance with the control signal and the information output from the rotation detecting portion at the reference time intervals. The control unit includes a time change adjustment unit. For at least one of the braking torque and the rotational torque, the time change adjustment unit changes the braking torque so that a current braking torque reaches the target braking torque and/or changes the rotational torque so that a current rotational torque reaches the target rotational torque in a predetermined time period greater than the reference time interval. According to the configuration, even if a sudden change occurs from the current braking torque to the target braking torque or a sudden change occurs from the current rotational torque to the target rotational torque, the sudden change can be mitigated, thus preventing the occurrence of torque fluctuation that the operator does not anticipate. As a result, the discomfort experienced by the operator can be reduced.

In the operating device according to the present invention, it is desirable that for at least one of the braking torque and the rotational torque, the time change adjustment unit change the braking torque such that the amount of change per reference time interval is substantially constant regardless of a value of the target braking torque and/or change the rotational torque such that the amount of change per reference time interval is substantially constant regardless of a value of the target rotational torque. As a result, even if the change from the current braking torque to the target braking torque is large or if the change from the current rotational torque to the target rotational torque is large, the discomfort experienced by the operator can be reduced.

In the operating device according to the present invention, it is desirable that for at least one of the braking torque and the rotational torque, the time change adjustment unit change the braking torque in a staircase manner with a step height of a fixed percentage of the amount of change from the current braking torque to the target braking torque and/or change the rotational torque such that the rotational torque changes in a staircase manner with a step height of a fixed percentage of the amount of change from the current rotational torque to the target rotational torque. Furthermore, it is desirable that the fixed percentage be set to a value in the range of 0.5% to 5% (inclusive). As a result, setting can be made easily and rapidly for the change from the current braking torque to the target braking torque and the change from the current rotational torque to the target rotational torque In the operating device according to the present invention, it is desirable that the predetermined time period be set to a value in the range of 50 ms to 200 ms, inclusive. As a result, the predetermined time period is lees than the time period that human being can perceive as a delay, so that a sudden change in braking torque or rotational torque can be settled within the time period that the operator perceives as a delay.

In the operating device according to the present invention, it is desirable that each of the braking torque pattern and the rotational torque pattern include at least a first torque pattern and a second torque pattern having different amounts of change per unit angle in accordance with a rotation direction of the rotating body. As a result, different tactile sensations can be created for the operator in accordance with the rotation direction of the rotating body and, thus, a variety of haptic feedbacks can be provided.

In the operating device according to the present invention, it is desirable that each of the braking torque pattern and the rotational torque pattern include at least a third torque pattern and a fourth torque pattern having different amounts of change per unit angle in accordance with a rotational speed of the rotating body. As a result, different tactile sensations can be created for the operator in accordance with the rotational speed of the rotating body and, thus, a variety of haptic feedbacks can be provided.

In the operating device according to the present invention, it is desirable that the brake applying portion include a magnetically responsive material and a magnetic field generation unit that generates a magnetic field passing through the magnetically responsive material. As a result, when the magnetic field generated by the magnetic field generating portion passes through the magnetically responsive material, the braking torque can be generated. Thus, the braking torque can be easily controlled by energization so as to have the target magnitude of the braking torque. In addition, a large braking torque can be generated.

DESCRIPTION OF THE PREFERRED EMBODIMENTS

Figure 1A:
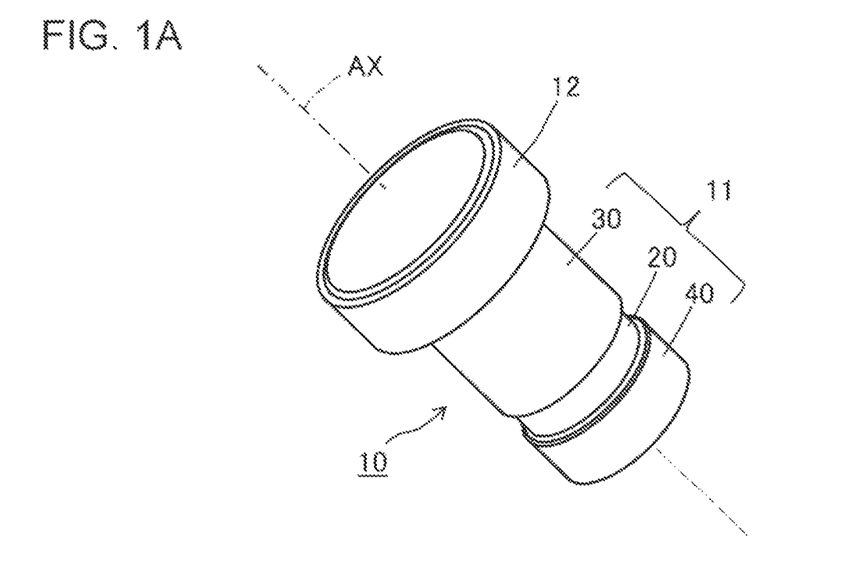
FIG. 1A is a perspective view illustrating a schematic configuration of an operating device according to an embodiment of the present invention.
Figure 1B:
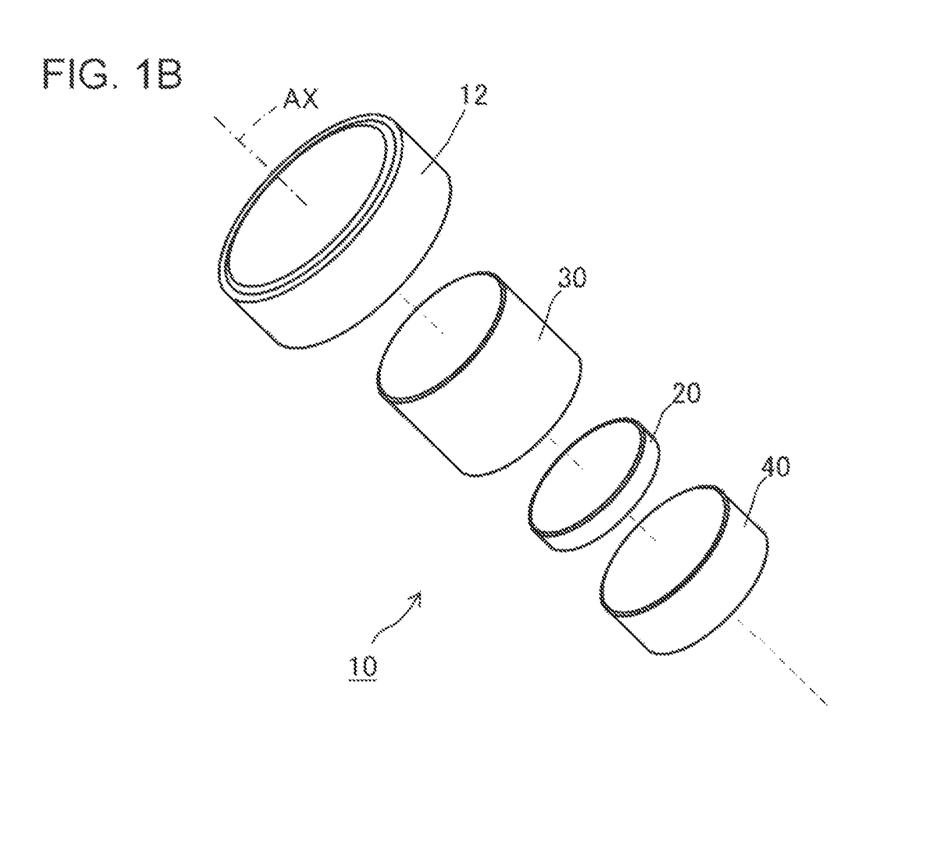
FIG. 1B is an exploded perspective view of the operating device illustrated in FIG. 1A.
Figure 2:
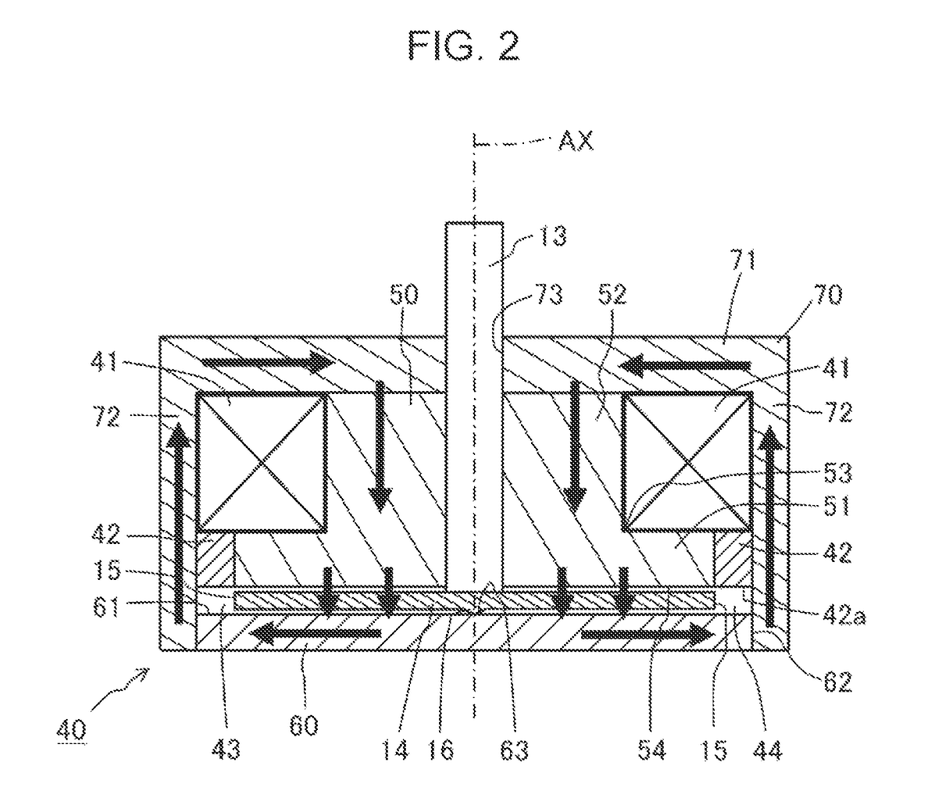
FIG. 2 is a cross-sectional view taken along the rotation axis of a brake applying portion according to the embodiment of the present invention.
Figure 3:
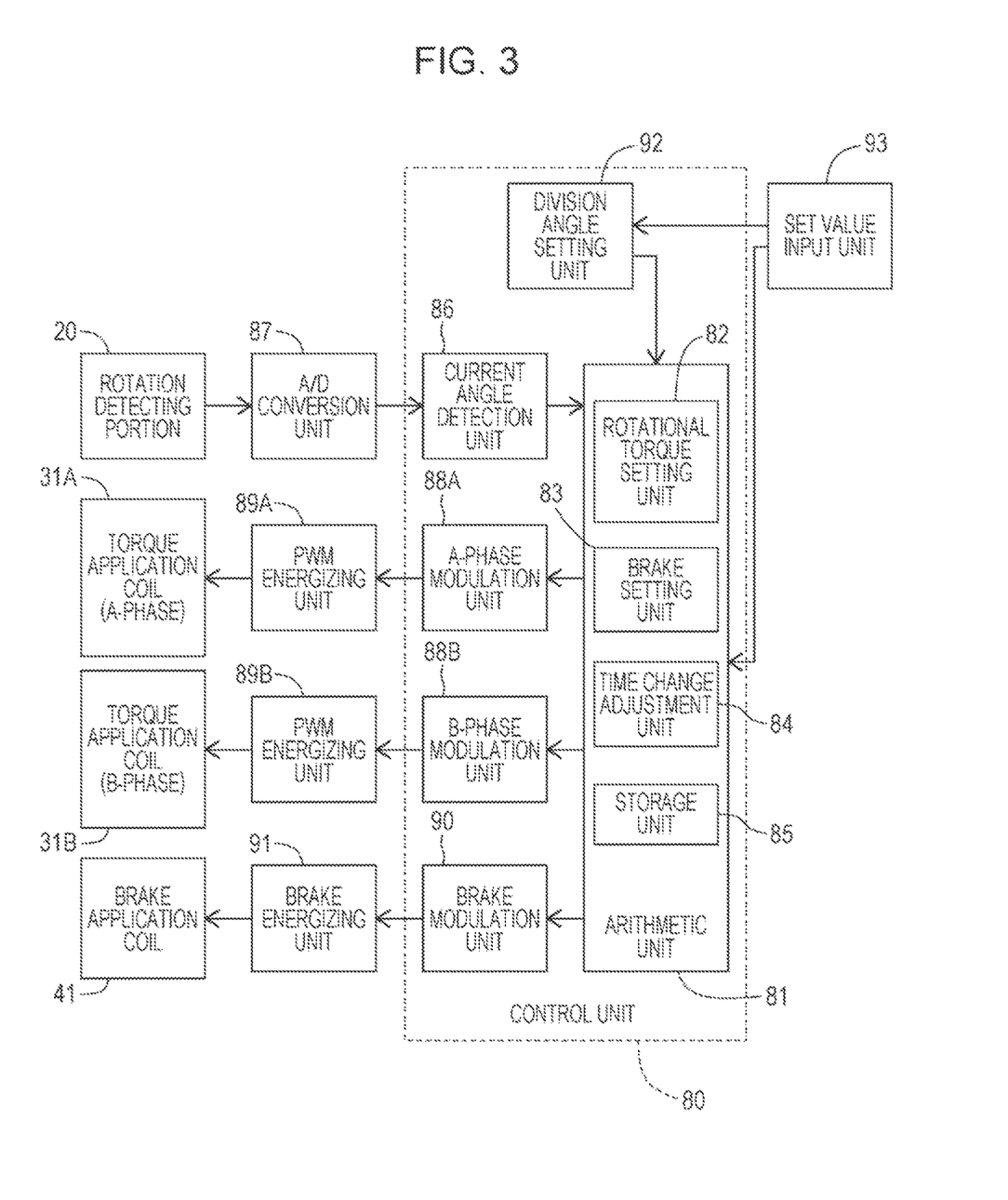
FIG. 3 is a functional block diagram of the operating device according to the embodiment of the present invention.

An operating device according to an embodiment of the present invention is described in detail below with reference to the accompanying drawings. FIG. 1A is a perspective view of a schematic configuration of an operating device 10 according to the present embodiment, and FIG. 1B is an exploded perspective view of the operating device 10 illustrated in FIG. 1A. FIG. 2 is a cross-sectional view of a brake applying portion 40 taken along a rotation axis AX according to the present embodiment, and FIG. 3 is a functional block diagram of the operating device 10. Note that in the following description, a direction along the rotation axis AX is also referred to as a "vertical direction", and a view from above downward is also referred to as a "plan view".

As illustrated in FIGS. 1A and 1B, the operating device 10 has a fixed portion 11 and a rotating body 12 rotatably supported by the fixed portion 11. Note that in FIGS. 1A and 1B, a control unit 80 (refer to FIG. 3), a power supply circuit, and the like are not illustrated.

The rotating body 12 has an operating shaft 13 (refer to FIG. 2) fixed thereto and extending along the rotation axis AX. The rotating body 12 and the operating shaft 13 are provided so as to be rotatable about the rotation axis AX. Note that the operating shaft 13 is not illustrated in FIG. 1B.

As illustrated in FIG. 1A, the fixed portion 11 includes a rotation detecting portion 20, a rotational torque applying portion 30, and a brake applying portion 40.

The operating shaft 13 has, fixed thereto, a detection plate (not illustrated) provided in the rotation detecting portion 20, a rotor (not illustrated) provided in the rotational torque applying portion 30, and a rotating plate 14 (refer to FIG. 2) provided in the brake applying portion 40. As illustrated in FIG. 2, the rotating plate 14 is fixed to the bottom surface of the operating shaft 13. The rotating plate 14 is a magnetic disk, the central axis of which is disposed so as to coincide with the rotation axis AX, and the upper surface and the lower surface thereof are perpendicular to the rotation axis AX. The operating shaft 13 is supported by a radial bearing (not illustrated) provided inside of the rotating body 12. Thus, the operating shaft 13 and the rotating body 12 are rotatable relative to the fixed portion 11.

In the internal space of the rotation detecting portion 20, the detection plate (not illustrated) and a rotation detection element (not illustrated) facing the detection plate are disposed, which constitute a non-contact rotation detection device. The rotation detection element is an optical detector or a magnetic detector that detects a rotation angle signal (A-phase and B-phase encoder pulses) corresponding to the rotation of the detection plate fixed to the operating shaft 13. In this manner, the rotation detection element detects the information regarding the rotation of the rotating body 12, for example, the rotation angle, the detection time, and the rotation direction, at predetermined reference time intervals.

Although not illustrated in FIGS. 1A and 1B, a torque application coil 31A of A phase and a torque application coil 31B of B phase that differs from A phase are fixed inside the rotational torque applying portion 30. Control currents having different phases are applied to the A-phase torque application coil 31A and the B-phase torque application coil 31B. The rotational torque applying portion 30 is provided with a columnar rotor (a magnet) (not illustrated) and is disposed so that the central axis thereof is located on the rotation axis AX. A control current corresponding to a rotation angle is applied to the A-phase torque application coil 31A and the B-phase torque application coil 31B so that the rotating torque is applied to the rotor. In this manner, rotational torque is applied to the rotating body 12. Note that the rotational torque applying portion 30 is only an example. A C-phase torque application coil and the like may be further provided in addition to the A-phase torque application coil 31A and the B-phase torque application coil 31B. In addition, a two-phase motor, a three-phase motor, or the like may be employed as the rotational torque applying portion 30.

As illustrated in FIG. 2, the brake applying portion 40 includes a magnetic viscous fluid 44 (a magnetically responsive material), a first yoke 50, a second yoke 60, a third yoke 70, an annular member 42, and a brake application coil 41. Braking torque is applied to the operating shaft 13 via the rotating plate 14. Note that the brake applying portion 40 illustrated in FIG. 2 is only an example, and other configurations is available as long as braking torque can be applied to the rotating body 12.

The rotating plate 14 disposed in the brake applying portion 40 is surrounded by the first yoke 50, the second yoke 60, the third yoke 70, and the annular member 42. The first yoke 50 is disposed so as to cover the upper side of the rotating plate 14, the second yoke 60 is disposed below the rotating plate 14, and the third yoke 70 is disposed so as to cover the upper side of the first yoke 50 and the radially outer side of the rotating plate 14. The first yoke 50, the second yoke 60, and the third yoke 70 are made of, a magnetic material, for example, iron or steel.

The first yoke 50 has an annular portion 51 and a cylindrical portion 52 integrally provided so as to extend upward from the upper surface of the annular portion 51 concentrically with the annular portion 51. The annular portion 51 and the cylindrical portion 52 have a circular shape centered on the rotation axis AX in plan view, and the outer diameter of the cylindrical portion 52 is less than that of the annular portion 51. Due to the difference in outer diameter between the annular portion 51 and the cylindrical portion 52, a stepped portion 53 is formed on the outer side of the outer peripheral surface of the cylindrical portion 52.

A lower surface 54 of the first yoke 50 faces the upper surface of the rotating plate 14. The lower surface 54 is formed so as to extend to a position corresponding to an outer peripheral edge 15 of the rotating plate 14 in the radial direction.

The second yoke 60 has a substantially disk shape and is disposed below the lower surface of the rotating plate 14. An upper surface 61 of the second yoke 60 faces the lower surface of the rotating plate 14.

A bearing portion 63 that receives a pivot portion 16 on the lower surface of the rotating plate 14 is provided at the center in the radial direction of the second yoke 60. Although simplified in FIG. 2, it is desirable that the bearing portion 63 be a concave portion that is concave from the upper surface 61 of the second yoke 60 downward so as to correspond to the shape of the pivot portion 16 or a hole portion that vertically penetrates the second yoke 60. The pivot portion 16 of the rotating plate 14 is supported by the bearing portion 63, so that the operating shaft 13 and the rotating plate 14 are supported in the axial direction.

The third yoke 70 has an upper wall portion 71 and a side wall portion 72. The upper wall portion 71 covers the first yoke 50 and is in contact with the upper surface of the first yoke 50. The side wall portion 72 extends downward from the outer periphery of the upper wall portion 71.

The third yoke 70 has a through-hole 73 that penetrates the third yoke 70 in the vertical direction, and the operating shaft 13 is inserted into the inside of the through-hole 73.

A radially outer edge portion 62 of the second yoke 60 is connected to the inner surface of the side wall portion 72 of the third yoke 70. As a result, the rotating plate 14 is sandwiched between the first yoke 50 and the second yoke 60, and the outer side in the radial direction is surrounded by the third yoke 70.

In the radial direction, an annular member 42 made from a non-magnetic member and having an annular shape is disposed between the first yoke 50 and the side wall portion 72 of the third yoke 70. The annular member 42 has a circular shape having substantially the same outer diameter as the brake application coil 41 disposed on the stepped portion 53 in plan view. The annular member 42 is fixed between the first yoke 50 and the third yoke 70 in the radial direction by using a thermosetting material or the like, which is a non-magnetic material. The annular member 42 is disposed such that a lower surface 42a thereof is located at the same height as the lower surface 54 of the first yoke 50 in the axial direction.

The upper surface of the rotating plate 14 faces the lower surface 54 of the first yoke 50 with a spacing therebetween, while the outer peripheral edge 15 faces the side wall portion 72 of the third yoke 70 with a spacing therebetween. In addition, the lower surface of the rotating plate 14 is disposed so as to face the upper surface 61 of the second yoke 60 other than the bearing portion 63 with a spacing therebetween.

As a result, a continuous gap 43 is formed between the rotating plate 14 and each of the first yoke 50, the annular member 42, the third yoke 70, and the second yoke 60 that surround the rotating plate 14. A magnetic viscous fluid 44 serving as a magnetically responsive material is disposed in the gap 43. The gap 43 may be filled with only the magnetic viscous fluid 44, but may contain air as long as the resistance applied to the operating shaft 13 can be ensured. Although not illustrated, an O-ring is provided to prevent the magnetic viscous fluid 44 loaded in the gap 43 from entering between the operating shaft 13 and the first yoke 50.

An annular brake application coil 41 wound around the rotation axis AX is disposed on the stepped portion 53 of the first yoke 50 between the first yoke 50 and the third yoke 70 in the radial direction. The brake application coil 41 is disposed in a range corresponding to the outer side of the rotating plate 14 including the outer peripheral edge 15 of the rotating plate 14 and the annular member 42 in the radial direction. In addition, the brake application coil 41 faces the rotating plate 14 with the first yoke 50 and the annular member 42 therebetween in the axial direction.

The brake application coil 41 serves as a magnetic field generation unit and generates a magnetic field passing through the magnetic viscous fluid 44 when energized by a brake energizing unit 91 (refer to FIG. 3) serving as a PWM energizing unit on the basis of the control performed by the control unit 80. Note that in FIG. 2, wiring to the brake application coil 41 is not illustrated.

The brake application coil 41 is surrounded by the first yoke 50 and the third yoke 70 from inside and outside in the radial direction and is surrounded by the second yoke 60 from below and by the third yoke 70 from above. For this reason, the magnetic field generated by the brake application coil 41 is led through a path formed by the first yoke 50, the second yoke 60, and the third yoke 70 and, thus, a magnetic circuit is formed.

When a current is applied to the brake application coil 41, a magnetic field having magnetic force lines indicated by arrows in FIG. 2 is generated. In the second yoke 60, a magnetic force line in the radial direction is generated. In the side wall portion 72 of the third yoke 70, a magnetic force line in the vertical direction is generated. Furthermore, in the upper wall portion 71 of the third yoke 70, a magnetic force line in a direction opposite to that in the second yoke 60, which is a direction along the radial direction, is generated. Still furthermore, in the first yoke 50, a magnetic force line in a direction opposite to that in the side wall portion 72, which is a direction along the vertical direction, is generated. As a result, in the rotating plate 14, the magnetic force lines pass through the rotating plate 14 vertically.

At this time, since the annular member 42 is disposed, the annular portion 51 of the first yoke 50 and the side wall portion 72 of the third yoke 70 are magnetically separated from each other below the brake application coil 41. For this reason, the magnetic force lines do not pass between the annular portion 51 and the side wall portion 72 in the radial direction, and the magnetic force lines flow in the vertical direction in the first yoke 50, so that the magnetic force lines efficiently travel across the rotating plate 14 in the vertical direction. Note that if the direction of energization of the brake application coil 41 is reversed, magnetic force lines in a direction opposite to those illustrated in FIG. 2 are generated.

Herein, the magnetic viscous fluid 44 is a substance having a viscosity that changes when a magnetic field is applied. For example, the magnetic viscous fluid 44 is a fluid in which particles (magnetic particles) made of a magnetic material are dispersed in a non-magnetic liquid (solvent). It is desirable that the magnetic particles contained in the magnetic viscous fluid 44 be, for example, iron-based particles containing carbon or ferrite particles. The diameter of the magnetic particles is preferably greater than or equal to 0.5 μm and, more preferably, greater than or equal to 1 μm. For the magnetic viscous fluid 44, it is desirable to select a solvent and magnetic particles so that the magnetic particles are less likely to precipitate due to the gravity. Furthermore, it is desirable that the magnetic viscous fluid 44 contain a coupling material that prevents the precipitation of the magnetic particles.

In the magnetic viscous fluid 44, when a current is applied to the brake application coil 41 to generate a magnetic field, the magnetic viscous fluid 44 is given a magnetic field in the vertical direction. Due to the magnetic field, the magnetic particles dispersed in the magnetic viscous fluid 44 gather along the magnetic force lines, and the magnetic particles arranged in the vertical direction are magnetically connected to each other to form a cluster. In this situation, if the operator rotates the operating device 10 to apply a force to rotate the operating shaft 13 about the rotation axis AX, a shearing force acts on the connected magnetic particles and, thus, a resistant force (braking torque) caused by these magnetic particles is generated. In this manner, the operator can feel the resistance, as compared with the situation where the magnetic field is not generated. The magnitude of the resistance changes in accordance with the intensity of the generated magnetic field. That is, by controlling the current applied to the brake application coil 41, control can be performed so that the operator feels a resistance force of a desired magnitude.

In contrast, if the magnetic field is not generated by the brake application coil 41, the magnetic particles are dispersed in the solvent. For this reason, when the operator rotates the operating device 10, the rotating body 12 rotates relative to the fixed portion 11 without receiving a large resistance force.

FIG. 3 is a block diagram illustrating the circuit configuration of the operating device 10 according to the present embodiment. The operating device 10 includes the control unit 80, the rotation detecting portion 20, the A-phase torque application coil 31A, the B-phase torque application coil 31B, the brake application coil 41, an A/D conversion unit 87, an A-phase PWM energizing unit 89A, a B-phase PWM energizing unit 89B, and the brake energizing unit 91.

The control unit 80 is mainly composed of a CPU and a memory. The control unit 80 performs a variety of processes in accordance with a program read from the memory.

The control unit 80 includes an arithmetic unit 81, a current angle detection unit 86, an A-phase modulation unit 88A, a B-phase modulation unit 88B, a brake modulation unit 90, and a division angle setting unit 92. The arithmetic unit 81 includes a rotational torque setting unit 82, a brake setting unit 83, a time change adjustment unit 84, and a storage unit 85.

The operating device 10 includes a set value input unit 93. The set value input unit 93 has an operating device, such as a keyboard, and a display. By operating the set value input unit 93, a set value is input to the arithmetic unit 81 and the division angle setting unit 92. Note that the set value input unit 93 may be incorporated into a device integrated with the control unit 80 or may have a separable configuration so as to be connected only at the time of input.

Each of detection outputs detected by the rotation detection element (not illustrated) provided in the rotation detecting portion 20 at above-described reference time intervals is converted into a digital value by the A/D conversion unit 87 and is provided to the current angle detection unit 86 of the control unit 80. The control unit 80 outputs a control signal corresponding to the provided detection output to the rotational torque setting unit 82 and the brake setting unit 83 at each reference time interval. In addition, the current angle detection unit 86 calculates information regarding the rotation of the rotating body 12 on the basis of the data from the A/D conversion unit 87 at each reference time interval and outputs the information to the arithmetic unit 81.

As described below, in the control unit 80, the rotational torque setting unit 82 controls the rotational torque applying portion 30, and the brake setting unit 83 controls the brake applying portion 40.

The rotational torque setting unit 82 sets a target rotational torque based on a preset rotational torque pattern in accordance with the control signal provided from the control unit 80 and the information output from the current angle detection unit 86 to the arithmetic unit 81 at each reference time interval. The rotational torque pattern is a pattern of a change in the angle of rotational torque. The target rotational torque is output to the time change adjustment unit 84. Since the control signal provided from the control unit 80 is generated on the basis of the information regarding the rotation of the rotating body 12, the control signal is a signal corresponding to, for example, the rotation angle, the detection time, and the rotation direction. For this reason, the target rotational torque can be changed in accordance with the information regarding the rotation of the rotating body 12 as needed. For example, if the rotating body 12 is not rotated after the target rotational torque is set, the setting of the target rotational torque is stopped in response to the control signal. After the rotation of the rotating body 12 is resumed, setting of the target rotation is resumed in response to the control signal. In addition, depending on the rotation state of the rotating body 12 after the target rotational torque is set, the target rotational torque can be set again in response to the control signal.

In contrast, the brake setting unit 83 sets the target braking torque based on a preset braking torque pattern in accordance with the control signal provided from the control unit 80 and the information output to the arithmetic unit 81 by the current angle detection unit 86 at each reference time interval. The braking torque pattern is a pattern of a change in the angle of the braking torque. The target braking torque is output to the time change adjustment unit 84. As described above, since the control signal provided from the control unit 80 is generated on the basis of the information regarding the rotation of the rotating body 12, the target braking torque can be changed corresponding to the information regarding the rotation of the rotating body 12 as needed.

Time Change Adjustment Unit

For at least one of the braking torque and the rotational torque, the time change adjustment unit 84 changes the braking torque so that the current braking torque reaches the target braking torque in a predetermined time period longer than the reference time interval and/or changes the rotational torque so that the current rotational torque reaches the target rotational torque in the predetermined time period. That is, the time change adjustment unit 84 has an adjustment function to change a predetermined time period in which the current braking torque reaches the target braking torque and/or the current rotational torque reaches the target rotational torque such that the predetermined time period is greater than the reference time interval. Note that when changing the predetermined time period in which the current braking torque reaches the target braking torque and/or the predetermined time period in which the current rotational torque reaches the target rotational torque at the reference time intervals, control is performed so that the time change adjustment unit 84 is skipped.

When changing the braking torque so that the current braking torque reaches the target braking torque in a predetermined time period greater than the reference time interval, the time change adjustment unit 84 changes the braking torque such that the amount of change per reference time interval is substantially constant regardless of the value of the target braking torque. Similarly, when changing the rotational torque so that the current rotational torque reaches the target rotational torque in a predetermined time period greater than the reference time interval, the time change adjustment unit 84 changes the rotational torque such that the amount of change per reference time interval is substantially constant regardless of the value of the target rotational torque.

Herein, to change the braking torque and/or the rotational torque such that the amount of change per reference time interval is substantially constant, the time change adjustment unit 84 changes the braking torque in a staircase manner with a step height of a fixed percentage of the amount of change from the current braking torque to the target braking torque and/or changes the rotational torque such that the rotational torque changes in a staircase manner with a step height of a fixed percentage of the amount of change from the current rotational torque to the target rotational torque.

When the above-described fixed percentage is set to a value in the range of 0.5% to 5% (inclusive) of the difference between the current rotational torque and the target rotational torque (the amount of change from the current rotational torque to the target rotational torque) or the difference between the current braking torque and the target braking torque (the amount of change from the current braking torque to the target braking torque), the braking torque and the rotational torque can be changed without causing the operator to feel the stepwise change in the torque. In addition, to reduce the discomfort given to the operator, it is desirable that the predetermined time period for changing the braking torque and the rotational torque be set to a value in the range of 50 ms to 200 ms (inclusive). If the time period is less than 50 ms, the feeling of discomfort given to the operator cannot be sufficiently reduced because the operator feels a sudden change in relation to the human tactile resolution. In contrast, if the time period is greater than 200 ms, the operator may perceive the time period as a time delay with respect to the operation, which is undesirable. However, if the time period is set to a value less than or equal to 200 ms, the time period is less than the time that human being can perceive as a delay. As a result, prevention of a sudden change in the braking torque and the rotational torque can be performed within such a time period that an operator does not perceive any delay. In this case, if the predetermined time period is 50 ms and the above-described fixed percentage is 2%, the unit time of the stepwise change is 1 ms. If the predetermined time period is 200 ms and the fixed percentage is 0.5%, the unit time of a stepwise change is 1 ms. Furthermore, since the human touch sensitivity varies from person to person, it is more desirable to set the predetermined time period to a value in the range of 80 ms to 170 ms (inclusive).

The A-phase modulation unit 88A controls the A-phase PWM energizing unit 89A in accordance with the change in the rotational torque set by the time change adjustment unit 84. Similarly, the B-phase modulation unit 88B controls the B-phase PWM energizing unit 89B in accordance with the change in the rotational torque set by the time change adjustment unit 84. More specifically, the A-phase modulation unit 88A calculates a control value based on the change in the rotational torque set by the time change adjustment unit 84, provides a control current of a duty ratio in accordance with the control value to the A-phase torque application coil 31A. The B-phase modulation unit 88B calculates a control value based on the rotational torque set by the time change adjustment unit 84 and provides a control current of the duty ratio in accordance with the control value to the B-phase torque application coil 31B.

In addition, the brake modulation unit 90 controls the brake energizing unit 91 in accordance with the change in the braking torque set by the time change adjustment unit 84. More specifically, the brake modulation unit 90 calculates a control value based on the braking torque set by the time change adjustment unit 84 and provides a control current of a duty ratio in accordance with the control value to the brake energizing unit 91.

At this time, it is desirable that each of the braking torque pattern and the rotational torque pattern has at least a first torque pattern and a second torque pattern having different amounts of changes per unit angle in accordance with the rotation direction of the rotating body 12. For example, the first torque pattern can be used when clockwise rotation is detected, while the second torque pattern can be used when counterclockwise rotation is detected. The second torque pattern has at least one of the braking torque pattern and the rotational torque pattern that differs from that in the first torque pattern.

In addition, it is desirable that each of the braking torque pattern and the rotational torque pattern has at least a third torque pattern and a fourth torque pattern having different amounts of changes per unit angle in accordance with the rotational speed of the rotating body 12. For example, the third torque pattern can be used when the calculation indicates that rotation is being performed at a speed less than or equal to a first threshold value, and the fourth torque pattern can be used when the calculation indicates that rotation is being performed at a speed greater than the first threshold value. The fourth torque pattern has at least one of the braking torque pattern and the rotational torque pattern that differs from that of the third torque pattern.

At this time, one of the third torque pattern and the fourth torque pattern may be shared by the above-described first torque pattern and the second torque pattern. Furthermore, when the calculation indicates that the second threshold value greater than the first threshold value is set and rotation is being performed at a speed higher than the second threshold value, a torque pattern that differs from both the third torque pattern and the fourth torque pattern can be used.

Figure 4A:
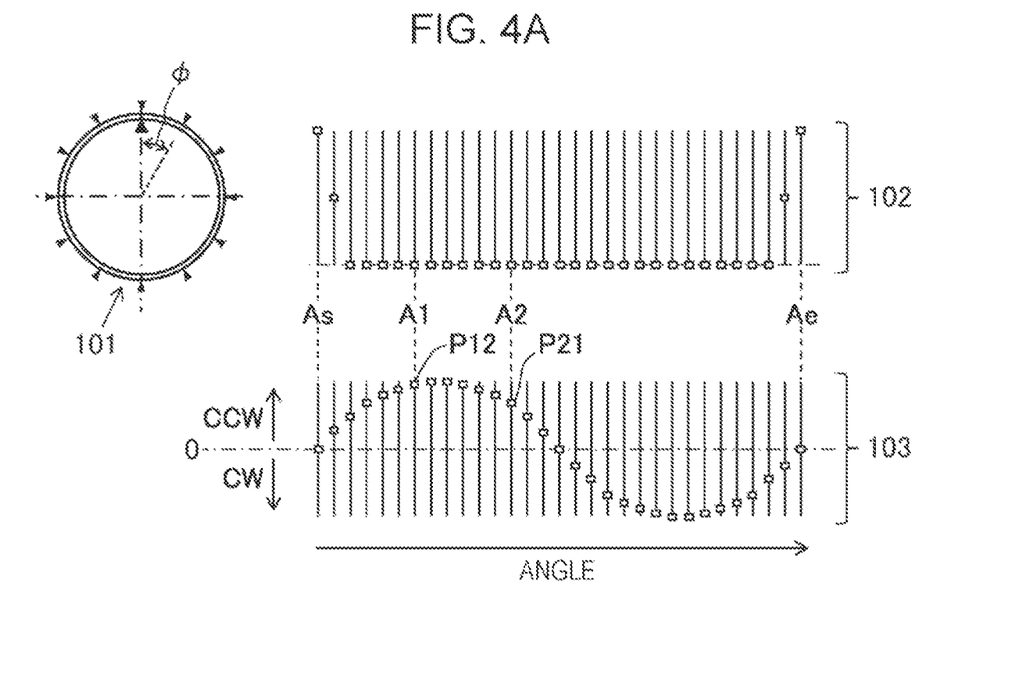
FIGS. 4A and 4B are diagrams illustrating an example of input screens displayed on a display of a set value input unit according to the embodiment of the present invention.
Figure 4B:
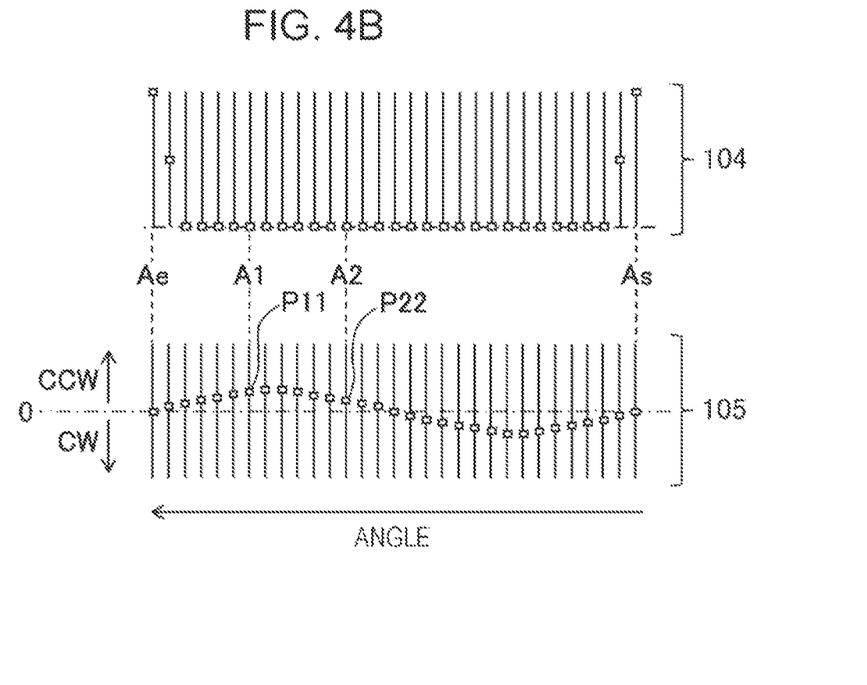
Figure 5:
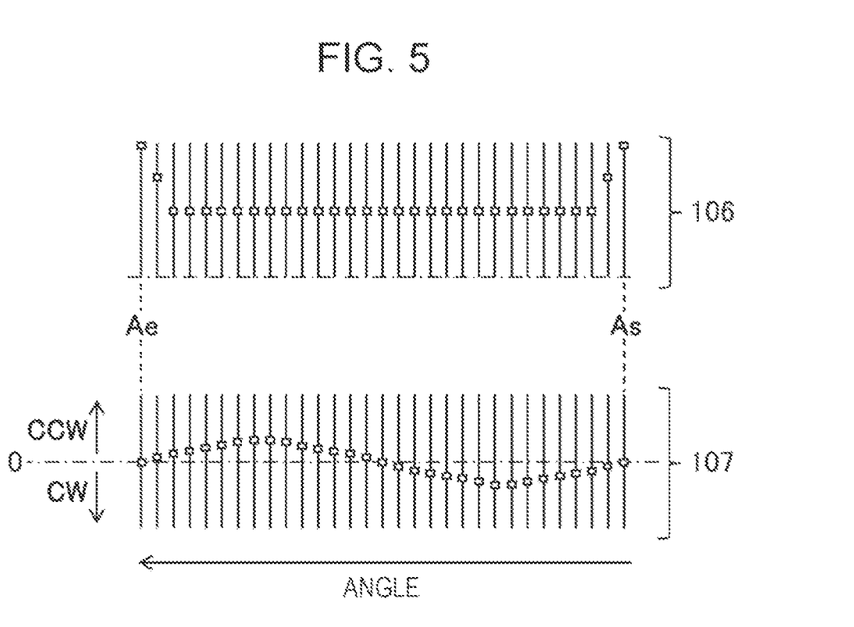
FIG. 5 is a diagram illustrating an example of an input screen displayed on the display of the set value input unit according to the embodiment of the present invention.

The operation performed by the operating device 10 is described below. FIGS. 4A and 4B and FIG. 5 are diagrams illustrating examples of an input screen displayed on the display of the set value input unit 93. FIG. 4A illustrates a torque pattern (a first torque pattern) set for rotation of the rotating body 12 in the clockwise (CW) direction, and FIG. 4B illustrates a torque pattern (a second torque pattern) set for rotation in the counterclockwise (CCW) direction. FIG. 5 illustrates a torque pattern (a fourth torque pattern) set to give frictional haptic feedback to the third torque pattern when the torque pattern illustrated in FIG. 4A is defined as the third torque pattern.

The set values to be set for the torque pattern illustrated in FIGS. 4A and 4B and FIG. 5 are input by using a keyboard device provided in the set value input unit 93 or another operating device.

By inputting a set value to the set value input unit 93, a division angle φ, which is one unit of haptic feedback control when the operating shaft 13 is rotated, is set. As illustrated in FIG. 4A, a division angle setting screen 101 is displayed on the display of the set value input unit 93, and the set number of divisions and division angle φ within one rotation can be seen. The division angle φ can be set to any value. In the division angle setting screen 101 illustrated in FIG. 4A, one rotation of the rotating body 12 is divided into 12, and the division angle φ is set to an equal angle of 30 degrees. The number of divisions in one rotation can be freely selected, such as 6 or 24. Alternatively, a plurality of division angles φ can be set to different angles, instead of equal angles. Still alternatively, the division angles may be only one angle. That is, the rotating body 12 may be rotatable only within the range of one division angle.

Furthermore, as torque patterns, brake setting screens 102 and 104 (upper charts in FIGS. 4A and 4B) and rotational torque setting screens 103 and 105 (lower charts in FIGS. 4A and 4B) are displayed on the display of the set value input unit 93. Alternatively, the brake setting screen 102 and a brake setting screen 106 (upper charts in FIG. 4A and FIG. 5) and the rotational torque setting screen 103 and a rotational torque setting screen 107 (lower charts in FIG. 4A and FIG. 5) are displayed.

In the brake setting screens 102, 104, and 106, one division angle φ ("φ=30 degrees" in the example illustrated in FIG. 4A) set by the division angle setting unit 92 is further divided into 31 angles (the abscissa). Thus, the magnitude of the braking torque (the ordinate) at each of the angle positions of 30 divisions can be varied and set.

Similarly, in the rotational torque setting screens 103, 105, and 107, one division angle (φ=30 degrees) set by the division angle setting unit 92 is further subdivided into 31 angles, and the direction and magnitude of the rotational torque at each of the angle positions of 30 divisions can be changed and set. The braking torque pattern of the angle change of the set braking torque, the rotational torque pattern of the angle change of the rotational torque, the division angle φ, and the like are stored in the storage unit 85.

The case where the haptic feedback is changed in accordance with the rotation direction is described below with reference to FIGS. 4A and 4B. In the setting example illustrated in FIGS. 4A and 4B, changes in the braking torque and the rotational torque set within one division angle φ are illustrated when the rotating body 12 fixed to the operating shaft 13 is held by hand and is rotated in the clockwise (CW) direction (FIG. 4A) or counterclockwise (CCW) direction (FIG. 4B).

In the brake setting screen 102 and the rotational torque setting screen 103 illustrated in FIG. 4A, the left end is a start point As of the division angle and the right end is an end point Ae, whereas in the brake setting screen 104 and the rotational torque setting screen 105 illustrated in FIG. 4B, the right end is the start point As and the left end is the end point Ae.

In the brake setting screens 102 and 104 respectively illustrated in FIGS. 4A and 4B, the braking torque is set to a predetermined magnitude at the start point As and the end point Ae of one division angle φ (=30 degrees). In contrast, in the intermediate period between the start point As and the end point Ae, the braking torque is extremely small. The set values of the braking torque at the angle positions displayed on the brake setting screens 102 and 104 are provided from the brake setting unit 83 to the brake modulation unit 90 illustrated in FIG. 3. The brake modulation unit 90 controls the brake energizing unit 91 so that the duty ratio of a pulsed control current applied to the brake application coil 41 is determined.

As a result of setting the braking torque pattern in this way, a large current is applied to the brake application coil 41 at the start point As and the end point Ae of one division angle φ, and the brake magnetic field induced by the brake application coil 41 causes the magnetic powder in the magnetic viscous fluid 44 loaded in the gap 43 to form an agglomeration structure or a bridge structure, so that the rotational resistance of the rotating body 12 increases. In the intermediate period between the start point As and the end point Ae of the division angle φ, the brake application coil 41 is hardly energized, so that a brake magnetic field is not induced. During this period, the viscosity of the magnetic viscous fluid 44 does not increase, and the braking torque applied to the rotating body 12 decreases.

In the rotational torque setting screen 103 illustrated in FIG. 4A, setting is made such that the direction and magnitude of the rotational torque change according to a substantial sine curve from the start point As toward the end point Ae of one division angle φ (=30 degrees). The rotational torque applied to the rotating body 12 is substantially zero at the start point As and the end point Ae of the division angle φ. In the period from the start point As of the division angle φ to the midpoint of the division angle φ, the rotational torque (the resistance torque) in the counterclockwise direction (CCW) is applied to the rotating body 12, and the magnitude of the rotational torque gradually varies. In the period from the midpoint of the division angle φ to the end point Ae of the division angle φ, setting is made such that the rotational torque (the pull-in torque) in the clockwise direction (CW) is applied to the rotating body 12, and the magnitude of the rotational torque gradually varies.

In the rotational torque setting screen 105 illustrated in FIG. 4B, setting is made such that although the direction of the rotational torque (the clockwise direction or the counterclockwise direction) is opposite to that in the rotational torque setting screen 103 illustrated in FIG. 4A, the direction and magnitude of the rotational torque change according to a substantial sine curve from the start point As toward the end point Ae of one division angle φ. In addition, the maximum value of the magnitude of the rotational torque is set to be less than that in the case of the rotational torque setting screen 103. For this reason, in the period from the midpoint of the division angle φ to the end point Ae of the division angle φ, a clockwise rotational torque (pull-in torque) is applied to the rotating body 12, and the magnitude of the torque gradually varies, but the rotational torque is less than that in the case of the rotational torque setting screen 103.

When the braking torque pattern in the brake setting screen 102 illustrated in FIG. 4A and the rotational torque pattern in the rotational torque setting screen 103 illustrated in FIG. 4A are set, the operation feedback force varies for the hand that attempts to hold and rotate the rotating body 12 in the clockwise direction. In addition, when the braking torque pattern in the brake setting screen 104 illustrated in FIG. 4B and the rotational torque pattern in the rotational torque setting screen 105 illustrated in FIG. 4B are set, the operation feedback force varies for the hand that attempts to rotate the rotating body 12 in the counterclockwise direction. At this time, since the magnitude of the rotational torque in the rotational torque pattern set in the rotational torque setting screen 105 is set to be less than that in the rotational torque setting screen 103, the operation feedback force for the hand is reduced and, thus, the operator can feel the difference in the rotation direction by the difference in the feedback force. As a result, since transition of the haptic feedback is available by changing the rotation direction, a more variety of haptic feedbacks can be provided.

More specifically, when the rotating body 12 is rotated in the clockwise direction, a braking torque acts on the rotating body 12 in the brake applying portion 40 at the start point As of the division angle φ, as illustrated in FIG. 4A, so that the rotational resistance increases. When the operation unit is slightly rotated, the braking torque is released. However, the rotational torque serving as a resistance torque in the counterclockwise direction (CCW) is applied from the start point As to the midpoint of the division angle φ. After the midpoint, rotational torque is applied as the pull-in torque in the clockwise direction (CW). At the end point Ae of the division angle φ, the braking torque acts on the rotating body 12 again. As a result, while the rotating body 12 is being rotated by 360 degrees, the braking torque acts on the rotating body 12 intermittently at each division angle φ, and the resistance torque and the pull-in torque acts on the rotating body 12 within the division angle φ. Thus, the operator can obtain haptic feedback as if they rotated a rotary switch having mechanical contacts.

Even when the rotating body 12 is rotated in the counterclockwise direction, the braking torque acts on the rotating body 12 in the brake applying portion 40 at the start point As of the division angle φ, as illustrated in FIG. 4B, so that the rotational resistance increases. When the operation unit is slightly rotated, the braking torque is released. However, the rotational torque serving as a resistance torque in the clockwise direction (CW) is applied from the start point As to the intermediate point of the division angle φ. After the midpoint, a rotational torque is applied as a pull-in torque in the counterclockwise direction (CCW). At the end point Ae of the division angle φ, the braking torque acts on the rotating body 12 again. As a result, while the operator is rotating the rotating body 12 by 360 degrees, the braking torque acts on the rotating body 12 intermittently at each division angle φ, and the resistance torque and the pull-in torque act on the rotating body 12 within the division angle φ. As a result, the operator can obtain haptic feedback as if they rotated a rotary switch having mechanical contacts.

The case where the haptic feedback is changed in accordance with the rotational speed is described below with reference to FIG. 4A and FIG. 5. In the setting example in FIG. 5, the changes in the braking torque and the rotational torque set within one division angle φ are illustrated in the case where a predetermined braking torque is applied to provide a frictional haptic feedback when the rotating body 12 fixed to the operating shaft 13 is rotated in the counterclockwise (CCW) direction. In the brake setting screen 106 and the rotational torque setting screen 107 illustrated in FIG. 5, the right end is the start point As of the division angle, and the left end is the end point Ae, as in FIG. 4B.

In the brake setting screen 106 illustrated in FIG. 5, the braking torque is set to a predetermined magnitude at the start point As and the end point Ae of one division angle φ (=30 degrees). In addition, in the intermediate period between the start point As and the end point Ae, half the force of the braking torque at the start point As and the end point Ae is set. The set value of the braking torque at each angle position displayed in the brake setting screen 106 is provided from the brake setting unit 83 to the brake modulation unit 90 illustrated in FIG. 3, and the brake energizing unit 91 is controlled by the brake modulation unit 90. Thus, the duty ratio of the pulsed control current applied to the brake application coil 41 is determined.

Note that the rotational torque setting screen 107 illustrated in FIG. 5 is the same as the rotational torque setting screen 105 illustrated in FIG. 4B, and setting is made such that the direction and magnitude of the rotational torque change according to a substantial sine curve from the start point As toward the end point Ae of one division angle 4.

As a result of setting the braking torque pattern in this way, a large current is applied to the brake application coil 41 at the start point As and the end point Ae of one division angle φ, and the brake magnetic field induced by the brake application coil 41 causes the magnetic powder in the magnetic viscous fluid 44 loaded in the gap 43 to form an agglomeration structure or a bridge structure, so that the rotational resistance of the rotating body 12 increases.

Unlike the braking torque pattern illustrated in FIG. 4B, in the intermediate period between the start point As and the end point Ae of the division angle φ, a predetermined current is continuously supplied to the brake application coil 41, so that the brake magnetic field induced by the brake application coil 41 causes the magnetic powder in the magnetic viscous fluid 44 to form an agglomeration structure or a bridge structure. Thus, a predetermined rotational resistance is continuously applied to the rotating body 12 and, therefore, different haptic feedback can be obtained between the first speed and the second speed in the operation of rotating the rotating body 12 in the counterclockwise (CCW) direction. As a result, since the haptic feedback varies in accordance with the rotational speed in the operator's rotation operation, a more variety of haptic feedbacks can be provided.

As described above, since different torque patterns are applied in accordance with the direction and rotational speed of the rotation operation, a variety of haptic feedbacks can be provided. However, when, for example, the operation is performed in the opposite direction or the torque pattern is changed to a torque pattern with a different rotational speed in the rotation operation, a large difference in rotational torque or braking torque may occur.

Figure 6:
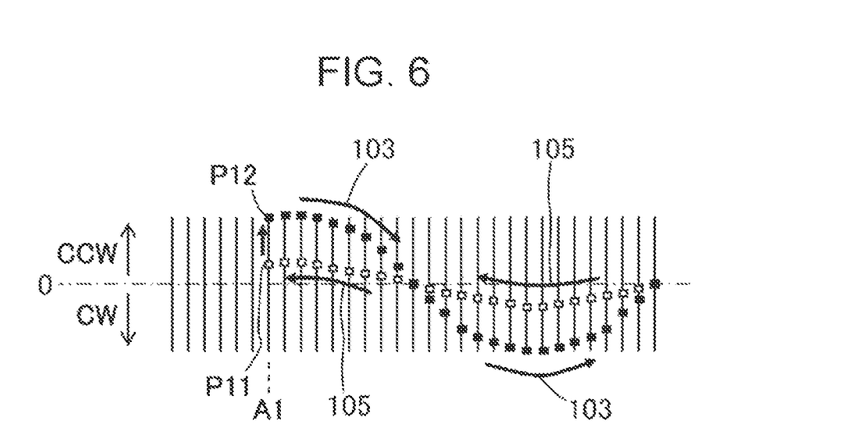
FIG. 6 is a diagram illustrating a situation in which the rotation direction is changed during the rotation operation.

For example, when the rotation direction is changed from the counterclockwise direction (FIG. 4B) to the clockwise direction (FIG. 4A) at the angle A1 illustrated in FIGS. 4A and 4B, there is no difference in the resistance force due to the braking torque before and after the change. However, as illustrated in FIG. 6, the rotational torque increases significantly from a rotational torque P11 during counterclockwise rotation to the rotational torque P12 during clockwise rotation.

Figure 7A:
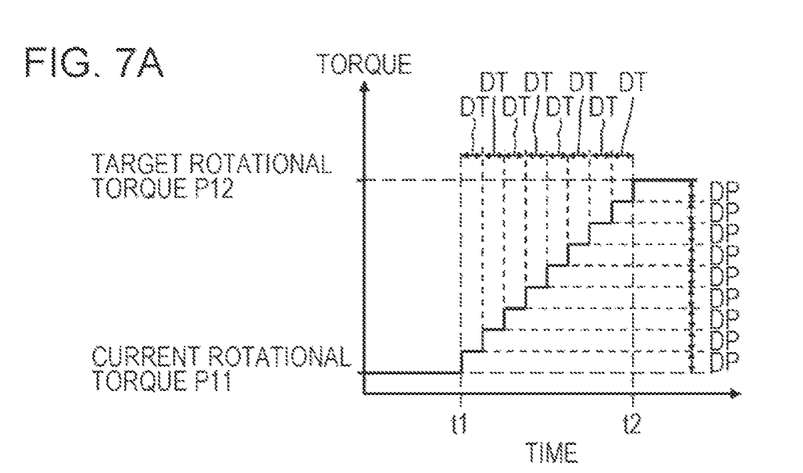
FIG. 7A is a graph illustrating a setting example to increase the rotational torque from a current rotational torque to a target rotational torque when the rotation direction is changed.

In the operating device 10, the time change adjustment unit 84 increases the rotational torque from the rotational torque P11, which is the current rotational torque, to the rotational torque P12, which is the target rotational torque, in a predetermined time period greater than the reference time interval. More specifically, as illustrated in FIG. 7A, the rotational torque is gradually increased in a staircase manner with the passage of time from a current time t1 at which the rotation direction is changed to a time t2 at which a time period longer than the reference time interval elapses. That is, the rotational torque is increased by a difference DP at every unit time DT. Note that FIG. 7A is a graph illustrating a setting example to increase the rotational torque from the current rotational torque to the target rotational torque when the rotation direction is changed.

As illustrated in FIG. 7A, the rotational torque is increased in a staircase manner by an amount corresponding to a fixed percentage (DP/DT) with the passage of time. By increasing the rotational torque in a staircase manner in this way, the amount of change in rotational torque per reference time interval is substantially constant. When the fixed percentage is set to a value in a predetermined range, for example, in the range of 0.5% to 5% (inclusive) of the difference between the current rotational torque and the target rotational torque, the discomfort that an operator experiences can be reduced in relation to the speed of human tactile sensation. That is, the discomfort caused by a sudden change in the rotational torque can be reduced. When the predetermined time period during which the braking torque and the rotational torque are changed is set to 50 ms, the unit time DT for the stepwise change is 1 ms in the case of the fixed percentage (DP/DT) of 2%, and when the predetermined time interval is set to 200 ms, the unit time DT is 1 ms in the case of the fixed percentage (DP/DT) of 0.5%.

It is desirable that the amount of change per reference time interval be substantially constant regardless of the value of the target rotational torque. For this reason, the number of steps of the stepwise increase in the rotational torque increases with increasing difference between the target rotational torque and the current rotational torque.

In addition, the amount of change in the rotational torque per reference time interval is set such that the rotational torque reaches the target torque in a time (the predetermined time period) that does not cause discomfort to the operator in relation to the speed of human tactile sensation. It is desirable that the lower limit of the predetermined time period be a time period that does not cause an operator to perceive a sudden change in relation to the human tactile resolution, for example, 50 ms. Furthermore, the upper limit value of the predetermined time period can be a time period that the operator does not perceive as a time delay with respect to the operation, for example, 200 ms.

Figure 7B:
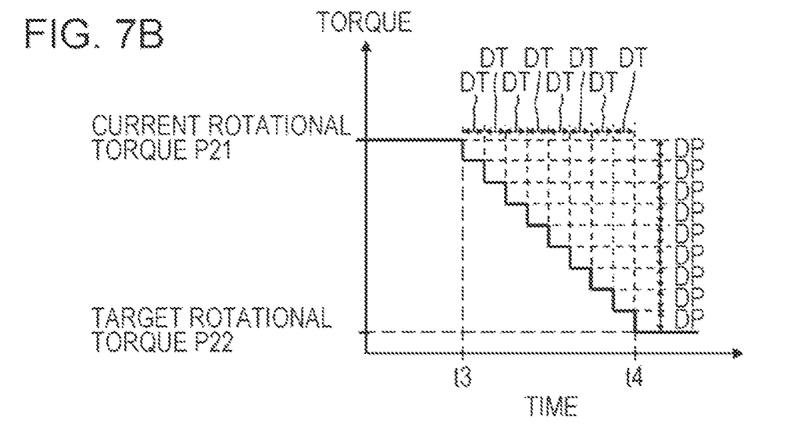
FIG. 7B is a graph illustrating a setting example to decrease the rotational torque from a current rotational torque to a target rotational torque.
Figure 7C:
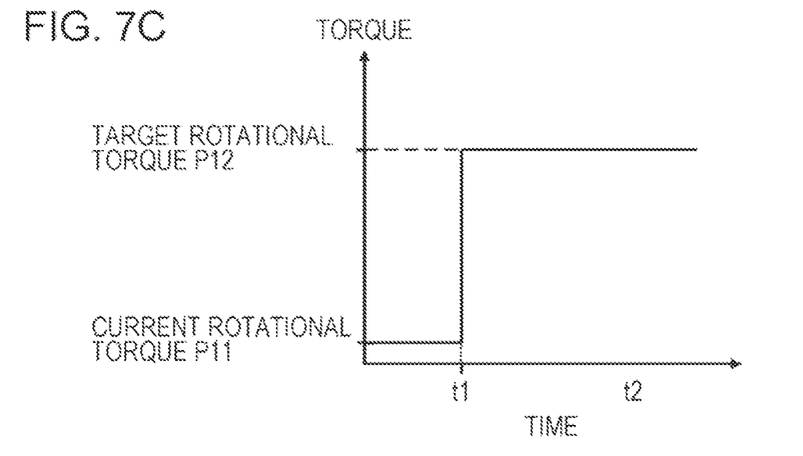
FIG. 7C is a graph illustrating a change in torque when the rotation direction is changed and when adjustment is not performed by a time change adjustment unit.

In contrast, when the time change adjustment unit 84 does not perform the adjustment, the rotational torque rapidly increases from the rotational torque P11 during counterclockwise rotation to the rotational torque P12 during clockwise rotation, as illustrated in FIG. 7C. Thus, the operator senses a large change in the rotational torque, which is different from the rotational torque pattern, and experiences an unexpected discomfort.

The case has been described above where the rotational torque increases significantly with the change in the rotation direction. In contrast, in the examples illustrated in FIGS. 4A and 4B, when the rotation direction is changed from the clockwise direction (FIG. 4A) to the counterclockwise direction (FIG. 4B) at an angle A2, there is no difference in resistance due to the braking torque before and after the change. However, the rotational torque significantly decreases from a rotational torque P21 during clockwise rotation to a rotational torque P22 during counterclockwise rotation.

In this case, in contrast to the example illustrated in FIG. 7A, as illustrated in FIG. 7B, the rotational torque is decreased from the above-described rotational torque P21, which is the current rotational torque, to the rotational torque P22, which is the target rotational torque, in a predetermined time period that is greater than the reference time interval. That is, as illustrated in FIG. 7B, the rotational torque is gradually decreased in a staircase manner with the passage of time from a current time t3 at which the rotation direction is changed to a time t4 after a time greater than the reference time interval elapses. Note that FIG. 7B is a graph illustrating a setting example to decrease the rotational torque from the current rotational torque to the target rotational torque when the rotation direction is changed.

Although the sign of the rotational torque in this case is reversed from that illustrated in FIG. 7A, the rotational torque is decreased in a staircase manner by an amount corresponding to a fixed percentage (DP/DT) with the passage of time. By decreasing the rotational torque in a staircase manner as described above, the amount of change in rotational torque per reference time interval is substantially constant. When the fixed percentage is set to a value in a predetermined range, for example, in the range of 0.5% to 5% (inclusive) of the difference between the current rotational torque and the target rotational torque, the discomfort that an operator experiences in relation to the speed of human tactile sensation can be reduced. That is, the discomfort caused by a sudden change in the rotational torque can be reduced.

As in the case illustrated in FIG. 7A, the amount of change per reference time interval is made substantially constant. In addition, the amount of change in rotational torque per reference time interval is the same as that in that case.

The examples illustrated in FIG. 4A and FIG. 4B are identical in that the braking torque is made extremely reduced in the intermediate period between the start point As and the end point Ae in both rotation directions. Even when the braking torque in the intermediate period is changed in accordance with the rotation direction as in the case where the torque pattern is changed from that illustrated in FIG. 4A to that illustrated in FIG. 5, the braking torque is changed to reach the target braking torque from the current braking torque in a predetermined time period greater than the reference time interval, in the same way as the rotational torque changes in FIGS. 7A and 7B.

As described above, even if a sudden change from the current braking torque to the target braking torque or from the current rotational torque to the target rotational torque occurs as a result of the calculation of the rotation direction or the rotational speed of the rotating body 12, the braking torque is changed to reach the target braking torque from the current braking torque in a predetermined time period greater than the reference time interval, and/or the rotational torque is changed to reach the target rotational torque from the current rotational torque in a predetermined time period greater than the reference time interval. Thus, the above-described sudden change can be mitigated so that the operator's tactile sense does not perceive the change. As a result, the occurrence of torque fluctuation that the operator does not anticipate can be prevented, which reduces the discomfort experienced by the operator. While the present invention has been described with reference to the above embodiment, the present invention is not limited to the above embodiment. Improvements or changes can be made within the purpose of improvement or the scope of the present invention.

As described above, according to the present invention, an operating device is useful in that a more variety of haptic feedbacks can be obtained and discomfort experienced by an operator can be reduced.

What is claimed is:

1. An operating device comprising:
a fixed portion;
a rotating body rotatably supported by the fixed portion;
a rotation detecting portion configured to detect information regarding rotation of the rotating body including at least rotation angles at reference time intervals;
a brake applying portion configured to apply braking torque to the rotating body;
a rotational torque applying portion configured to apply rotational torque to the rotating body; and
a control unit configured to control the brake applying portion and the rotational torque applying portion,
wherein the control unit includes a brake setting unit that controls the brake applying portion, a rotational torque setting unit that controls the rotational torque applying portion, and a storage unit that stores a braking torque pattern representing an angle change in the braking torque and a rotational torque pattern representing an angle change in the rotational torque,
wherein the control unit outputs a control signal to the brake setting unit and the rotational torque setting unit at the reference time intervals,
wherein the brake setting unit sets a target braking torque based on the braking torque pattern, and the rotational torque setting unit sets a target rotational torque based on the rotational torque pattern in accordance with the control signal and the information output from the rotation detecting portion at the reference time intervals,
wherein the control unit includes a time change adjustment unit, and
wherein for at least one of the braking torque and the rotational torque, the time change adjustment unit changes the braking torque so that a current braking torque reaches the target braking torque and/or changes the rotational torque so that a current rotational torque reaches the target rotational torque in a predetermined time period greater than the reference time interval.

2. The operating device according to claim 1, wherein the predetermined time period is set to a value in the range of 50 ms to 200 ms, inclusive.

3. The operating device according to claim 1, wherein the brake applying portion includes a magnetically responsive material and a magnetic field generation unit that generates a magnetic field passing through the magnetically responsive material.

4. The operating device according to claim 1, wherein for at least one of the braking torque and the rotational torque, the time change adjustment unit changes the braking torque such that an amount of change per reference time interval is substantially constant regardless of a value of the target braking torque and/or changes the rotational torque such that an amount of change per reference time interval is substantially constant regardless of a value of the target rotational torque.

5. The operating device according to claim 4, wherein for at least one of the braking torque and the rotational torque, the time change adjustment unit changes the braking torque in a staircase manner with a step height of a fixed percentage of an amount of change from the current braking torque to the target braking torque and/or changes the rotational torque such that the rotational torque changes in a staircase manner with a step height of a fixed percentage of an amount of change from the current rotational torque to the target rotational torque.

6. The operating device according to claim 5, wherein the fixed percentage is set to a value in the range of 0.5% to 5%, inclusive.

7. The operating device according to claim 4, wherein each of the braking torque pattern and the rotational torque pattern includes at least a first torque pattern and a second torque pattern having different amounts of change per unit angle in accordance with a rotation direction of the rotating body.

8. The operating device according to claim 4, wherein each of the braking torque pattern and the rotational torque pattern includes at least a third torque pattern and a fourth torque pattern having different amounts of change per unit angle in accordance with a rotational speed of the rotating body.

* * * * *